(12) United States Patent
Ishii et al.

(10) Patent No.: US 7,559,865 B2
(45) Date of Patent: Jul. 14, 2009

(54) TRANSMISSION APPARATUS FOR A WORKING VEHICLE

(75) Inventors: Norihiro Ishii, Hyogo (JP); Hiroaki Shimizu, Hyogo (JP); Akihiro Ima, Hyogo (JP); Atsuo Yoshina, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 92 days.

(21) Appl. No.: 11/939,992

(22) Filed: Nov. 14, 2007

(65) Prior Publication Data
US 2008/0119317 A1    May 22, 2008

Related U.S. Application Data

(63) Continuation of application No. 11/071,736, filed on Mar. 4, 2005, now Pat. No. 7,303,498.

(30) Foreign Application Priority Data
Mar. 5, 2004    (JP)    ............................. 2004-62503

(51) Int. Cl.
*F16H 47/04* (2006.01)
*B60K 17/356* (2006.01)
(52) U.S. Cl. ........................................ 475/72; 180/242
(58) Field of Classification Search ............... 180/242
See application file for complete search history.

(56) References Cited

U.S. PATENT DOCUMENTS

| | | | | |
|---|---|---|---|---|
| 4,138,907 A | * | 2/1979 | Melles | 475/74 |
| 4,446,756 A | * | 5/1984 | Hagin et al. | 475/75 |
| 4,776,233 A | * | 10/1988 | Kita et al. | 475/76 |
| 4,813,306 A | * | 3/1989 | Kita et al. | 475/80 |
| 5,785,623 A | * | 7/1998 | Iino et al. | 475/72 |
| 6,530,855 B1 | | 3/2003 | Folsom et al. | |
| 6,918,850 B2 | * | 7/2005 | Hasegawa et al. | 475/72 |
| 2002/0094902 A1 | | 7/2002 | Pollman | |
| 2003/0162618 A1 | * | 8/2003 | Hasegawa et al. | 475/72 |

(Continued)

FOREIGN PATENT DOCUMENTS

DE    42 36 671 C1    11/1992

(Continued)

OTHER PUBLICATIONS

Patent Abstracts of Japan, English Language Abstract for Publication No. 2002067719.

(Continued)

*Primary Examiner*—Dirk Wright
(74) *Attorney, Agent, or Firm*—Sterne, Kessler, Goldstein & Fox P.L.L.C.

(57) ABSTRACT

A working vehicle comprises: a power source having an output shaft; axles; a cargo deck; and a transmission apparatus for driving axles disposed below the cargo deck. The transmission apparatus includes an input shaft drivingly connected to the output shaft of the power source, a hydro-mechanical stepless transmission driven by the input shaft, and a differential gear assembly differentially connecting the axles to each other. The hydro-mechanical stepless transmission includes a planetary gear assembly and a hydrostatic stepless transmission drivingly connected to the planetary gear assembly. The differential gear assembly is drivingly connected to the hydro-mechanical stepless transmission.

6 Claims, 11 Drawing Sheets

U.S. PATENT DOCUMENTS

2005/0192148 A1* 9/2005 Hasegawa et al. ............ 475/72

FOREIGN PATENT DOCUMENTS

| EP | 0 513 674 A1 | 11/1992 |
| --- | --- | --- |
| EP | 0 699 850 A2 | 3/1996 |
| JP | 2002-67719 | 3/2002 |
| WO | WO 89/09899 | 10/1989 |

OTHER PUBLICATIONS

European Search Report for European Appl. No. 05004764, European Patent Office, The Hague, mailed on Feb. 8, 2007, 4 pages.

* cited by examiner

TRANSMISSION APPARATUS FOR A WORKING VEHICLE

CROSS-REFERENCE TO RELATED APPLICATIONS

This application is a Continuation of U.S. application Ser. No. 11/071,736, filed Mar. 4, 2005, the entire disclosure of which is incorporated herein by reference.

BACKGROUND OF THE INVENTION

1. Field of the Invention

The present invention relates to a transmission apparatus including a hydro-mechanical stepless transmission (hereinafter, "HMT"), which is a combination of a hydrostatic stepless transmission (hereinafter, "HST") and a planetary gear assembly, applied for a working vehicle such as a cart.

2. Related Art

Conventionally, as disclosed in Japanese Unpatented Application Publication No. 2002-67719, there is a well-known cart having a belt type continuously variable transmission (CVT) serving as a main speed changing unit, combined with a mechanical gear transmission on the downstream thereof serving as an auxiliary speed-changing unit, wherein a mechanical reverser for changing the forward and backward travel direction of the cart is disposed in the auxiliary speed-changing unit.

The belt type CVT has the disadvantageous of insufficient power transmission efficiency, because of frictional pressure of a belt against a pulley, and because of slipping of the belt against the pulley when the belt is wet.

The auxiliary speed-changing gear transmission having the mechanical reverser requires a clutch. In other words, the clutch must be disengaged so as to cut off power transmission for changing the reverser, thereby causing a shock and noise of meshing gears. A hydraulic clutch can reduce such shock and noise; however, it requires an expensive hydraulic fluid source. Further, the hydraulic clutch also has to cut off power transmission for changing the forward and backward traveling direction of a cart, thereby still causing a shock.

Another problem of the cart is that a cargo deck is reduced in volume by the gear transmission disposed therebelow. From this viewpoint, a compact transmission to be disposed below a cargo deck of a cart is requested. Such a compact transmission can increase the volume of the cargo deck, reduce the height of the cargo deck for convenience of loading, increase a road clearance below the cart, and stably lower the gravity center of the cart.

SUMMARY OF THE INVENTION

An object of the invention is to provide a transmission apparatus for a working vehicle including a power source having an output shaft, a cargo deck, and rear axles disposed below the cargo, wherein the transmission apparatus for driving axles is compact and advantageous in its power transmission efficiency and energy costs.

To achieve the object, according to the present invention, the transmission apparatus includes an input shaft drivingly connected to the output shaft of the power source, an HMT driven by the input shaft, and a differential gear assembly differentially connecting the axles to each other and drivingly connected to the HMT. The HMT includes a planetary gear assembly and an HST drivingly connected to the planetary gear assembly.

In comparison with a simple HST, the HMT is advantageous in power transmission efficiency and energy cost. Further, the HST of the HMT, i.e., the hydraulic pump and motor, can be small-sized in volume so as to minimize the transmission apparatus. The HMT is also advantageous in power transmission efficiency in comparison with a CVT including a belt, which frictionally fits pulleys, and, if being wet, slips against the pulleys. Further, the HMT does not require a mechanical reverser which causes shock and noise of meshing gears during change thereof.

Preferably, the HMT belongs to an input dividing type, such as to distribute a rotary force of the input shaft of the transmission apparatus between the planetary gear assembly and the HST. The HST includes a hydraulic pump having a pump shaft for receiving the distributed rotary force from the input shaft, and a hydraulic motor fluidly connected to the hydraulic pump. The hydraulic motor has a motor shaft for transmitting a rotary force to the planetary gear assembly and the differential gear assembly. The input dividing type HMT is advantageous in mobility because the neutral setting of the HST, i.e., the neutral setting of the hydraulic pump, coincides to the stationary timing of the vehicle, i.e., the turning point of the vehicle between forward traveling and backward traveling. The stepless speed changing by the HMT can reduce shock and noise of meshing gears at the turning point of the vehicle between forward traveling and backward traveling.

According to a first aspect of the transmission apparatus having the input dividing type HMT, the pump shaft and the motor shaft are disposed on one of front and rear sides of the input shaft, and the axles are disposed on the other rear or front side of the input shaft, thereby vertically minimizing the transmission apparatus. The vertically minimized transmission apparatus can ensure a large volume of the cargo deck above the transmission apparatus, and can stably lower the gravity center of the vehicle.

In the first aspect, preferably, the input shaft, the pump shaft, the motor shaft and the axles are disposed in parallel, thereby being able to minimize the transmission apparatus in the radial direction of the axles, typically in the fore-and-aft direction or vertically.

In the first aspect, preferably, the pump shaft and the motor shaft are disposed above and below when viewed in axial section. Therefore, even when gears are provided on the respective pump and motor shafts, the transmission apparatus can be minimized in the fore-and-aft direction and in the axial direction of the axles, i.e., laterally.

In the first aspect, preferably, the input shaft is different in height from the axles, thereby reducing a space between the input shaft and the axles in the fore-and-aft direction.

In the first aspect, preferably, the transmission apparatus further comprises an auxiliary speed-changing assembly drivingly interposed between the HMT and the differential gear assembly. The auxiliary speed-changing assembly includes a rotary shaft disposed between the input shaft and the axles in parallel to the input shaft, thereby being able to vertically minimize the transmission apparatus.

Further preferably, the rotary shaft of the auxiliary speed-changing assembly is different in height from a line interposed center axes of the input shaft and the axles, thereby reducing a space between the input shaft and the axles in the fore-and-aft direction.

According to a second aspect of the transmission apparatus having the input dividing type HMT, the pump shaft and the motor shaft are disposed on one of upper and lower sides of the input shaft, and the axles are disposed on the other lower or upper side of the input shaft, thereby minimizing the transmission apparatus in the axial direction of the axle, i.e., laterally.

In the second aspect, preferably, the input shaft, the pump shaft and the motor shaft are disposed in parallel and in perpendicular to the axles. Therefore, even when gears are provided on the respective pump and motor shafts, the transmission apparatus can be minimized in the fore-and-aft direction.

In the second aspect, preferably, the pump shaft and the motor shaft are substantially leveled with each other when viewed in axial section, thereby vertically minimizing the transmission apparatus.

In the second aspect, preferably, the input shaft is disposed coaxially to the output shaft of the power source. Due to this arrangement, the input shaft can be drivingly connected to the output shaft via a clutch instead of a belt and pulleys, thereby reducing power loss.

In the second aspect, preferably, the transmission apparatus further comprises an auxiliary speed-changing assembly drivingly interposed between the HMT and the differential gear assembly. The auxiliary speed-changing assembly includes a rotary shaft disposed between the input shaft and the axles in parallel to the input shaft, thereby minimizing the transmission apparatus in the radial direction of the rotary shaft of the auxiliary speed-changing assembly.

Further preferably, the HST is disposed above the input shaft, and the rotary shaft of the auxiliary speed-changing assembly is disposed below the input shaft so that axes of the rotary shaft and the axles are substantially leveled with each other, thereby increasing a road clearance below the transmission apparatus.

These, further and other objects, features and advantages will appear more fully from the following description with reference to accompanying drawings.

DETAILED DESCRIPTION OF THE INVENTION

Figure 1:
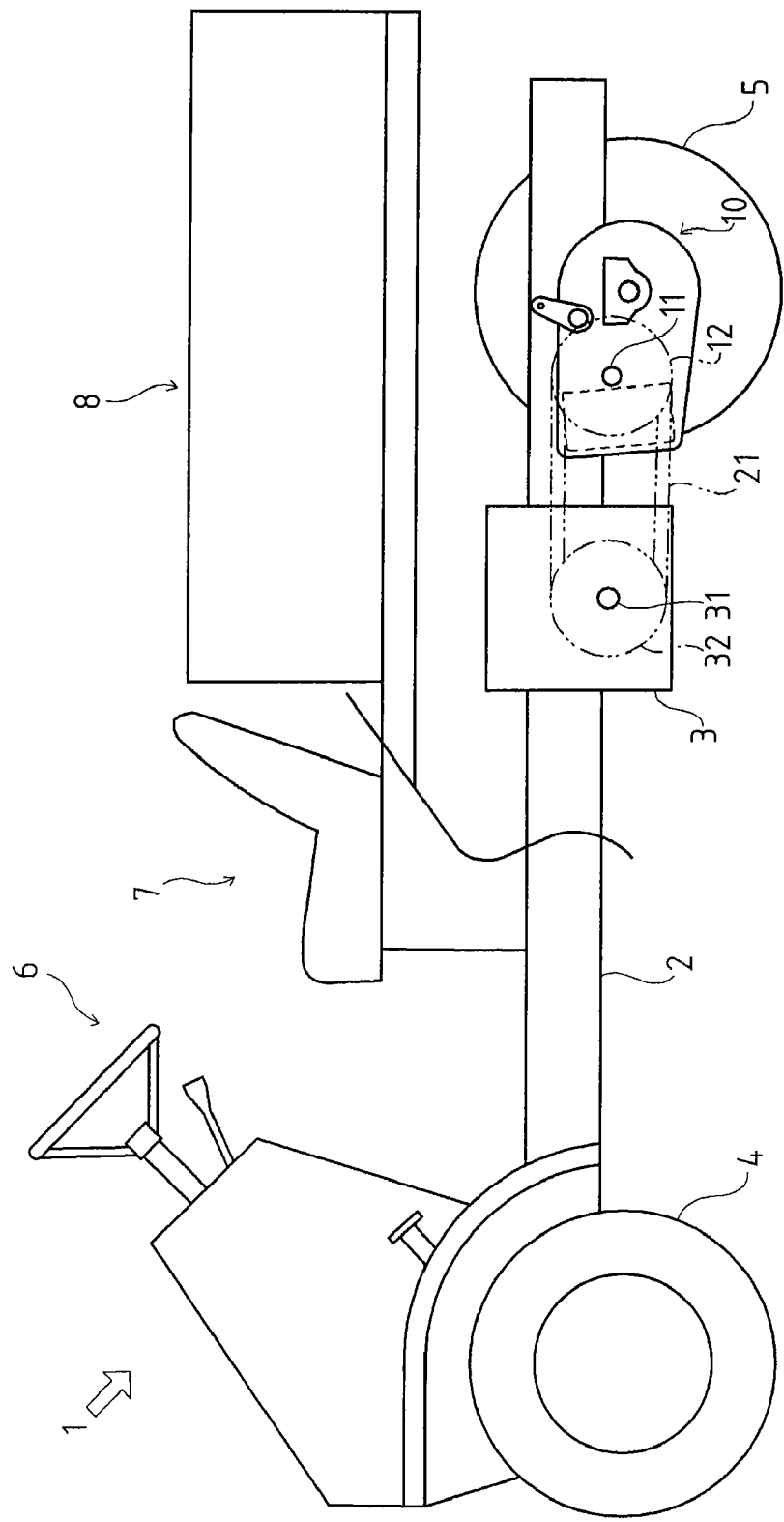
FIG. 1 is a side view of a cart serving as an example of a working vehicle having a transmission apparatus according to the present invention.

A first embodiment shown in FIGS. 1 to 6 will be described. Referring to FIG. 1, a cart 1 has a frame 2 supporting an engine 3 and a transmission apparatus 10. Cart 1 has a pair of left and right front wheels 4 and a pair of left and right rear wheels 5. An operation part 6 is constructed on a front portion of frame 2 above front wheels 4, and an operator's seat 7 is disposed above frame 2 between front wheels 4 and rear wheels 5 behind operation part 6. A cargo deck 8 is disposed behind seat 7 above engine 3 and transmission apparatus 10 supported by frame 2.

Figure 2:
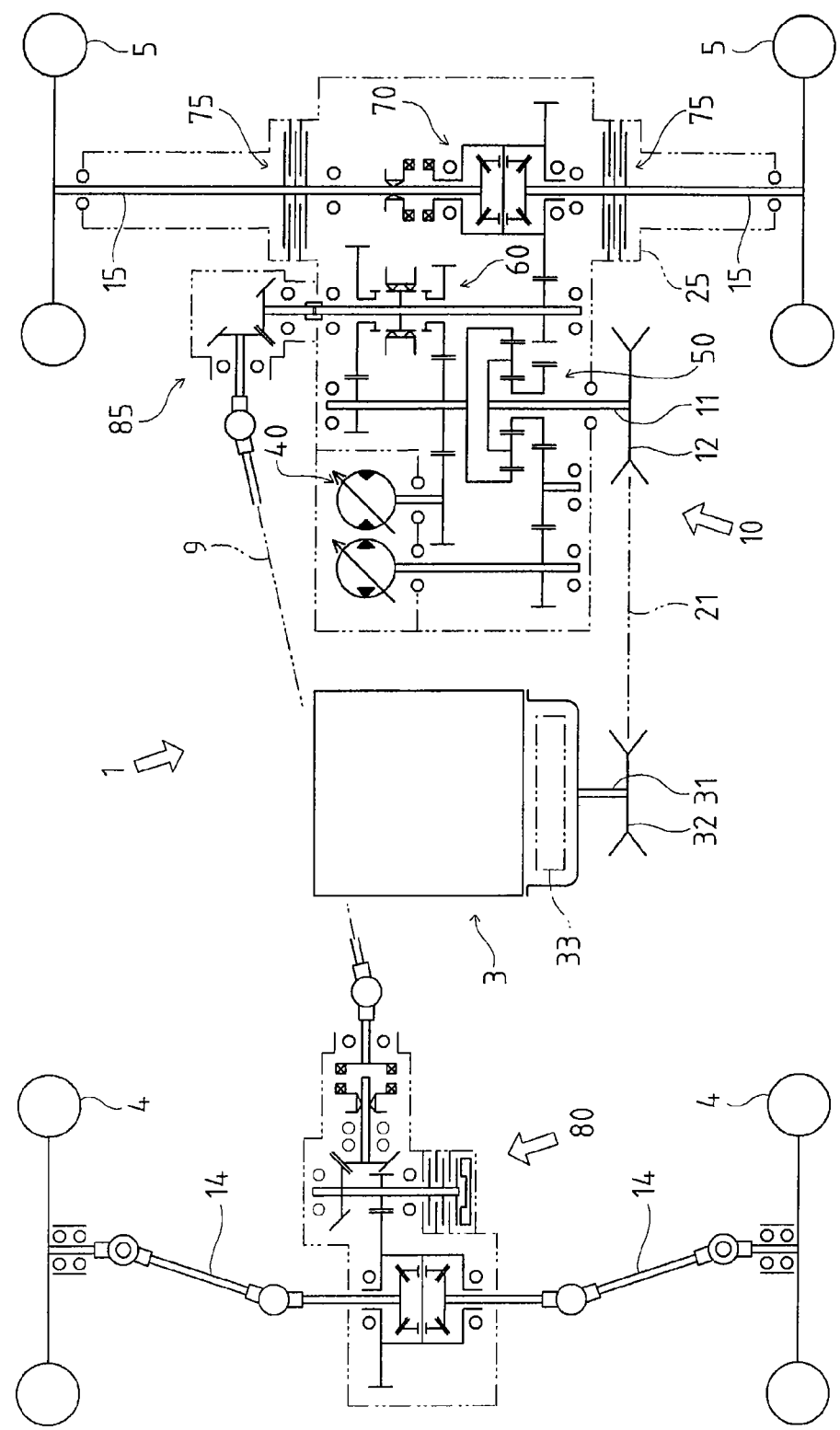
FIG. 2 is a diagram of a mechanical and hydraulic drive system of the cart equipped with a transmission apparatus including an HMT according to a first embodiment.

Power of engine 3 is transmitted via transmission apparatus 10 to rear wheels 5, and to front wheels 4 as needed, as understood from FIG. 2. In this regard, a pulley 32 is fixed on a laterally horizontal engine output shaft 31 projecting outward from a flywheel 33 of engine 3, a pulley 12 is fixed on a laterally horizontal input shaft 11 of transmission apparatus 10, and a belt 21 is looped over pulleys 32 and 12.

Transmission apparatus 10 includes an HST 40, a planetary gear assembly 50, an auxiliary speed-changing gear assembly 60, and differential gear assembly 70 differentially connecting left and right rear axles 15. HST 40 and planetary gear assembly 50 are drivingly connected to each other so as to constitute an HMT. Input shaft 11 of transmission apparatus 10 receives power of engine 3 from belt 21 so as to drive rear wheels 5 attached onto respective axles 15. To drive front wheels 4, a front transaxle 80 steerably and drivingly supporting front wheels 4 is drivingly connected to transmission apparatus 10 via a propeller shaft 9 extended forward from transmission apparatus 10 and universal joints.

The HMT belongs to an input dividing type, such that the rotary force of input shaft 11 is distributed between planetary gear assembly 50 and HST 40. Planetary gear assembly 50 has a planetary carrier 51, whose rotary center axis is input shaft 11 for receiving power of engine 3 via belt 21. Planetary gears 51a pivoted on carrier 51 mesh with a sun gear 52 for driving a hydraulic pump 41 of HST 40, and mesh with an internal gear 53 for receiving an output force of a hydraulic motor 43 of HST 40.

Figure 3:
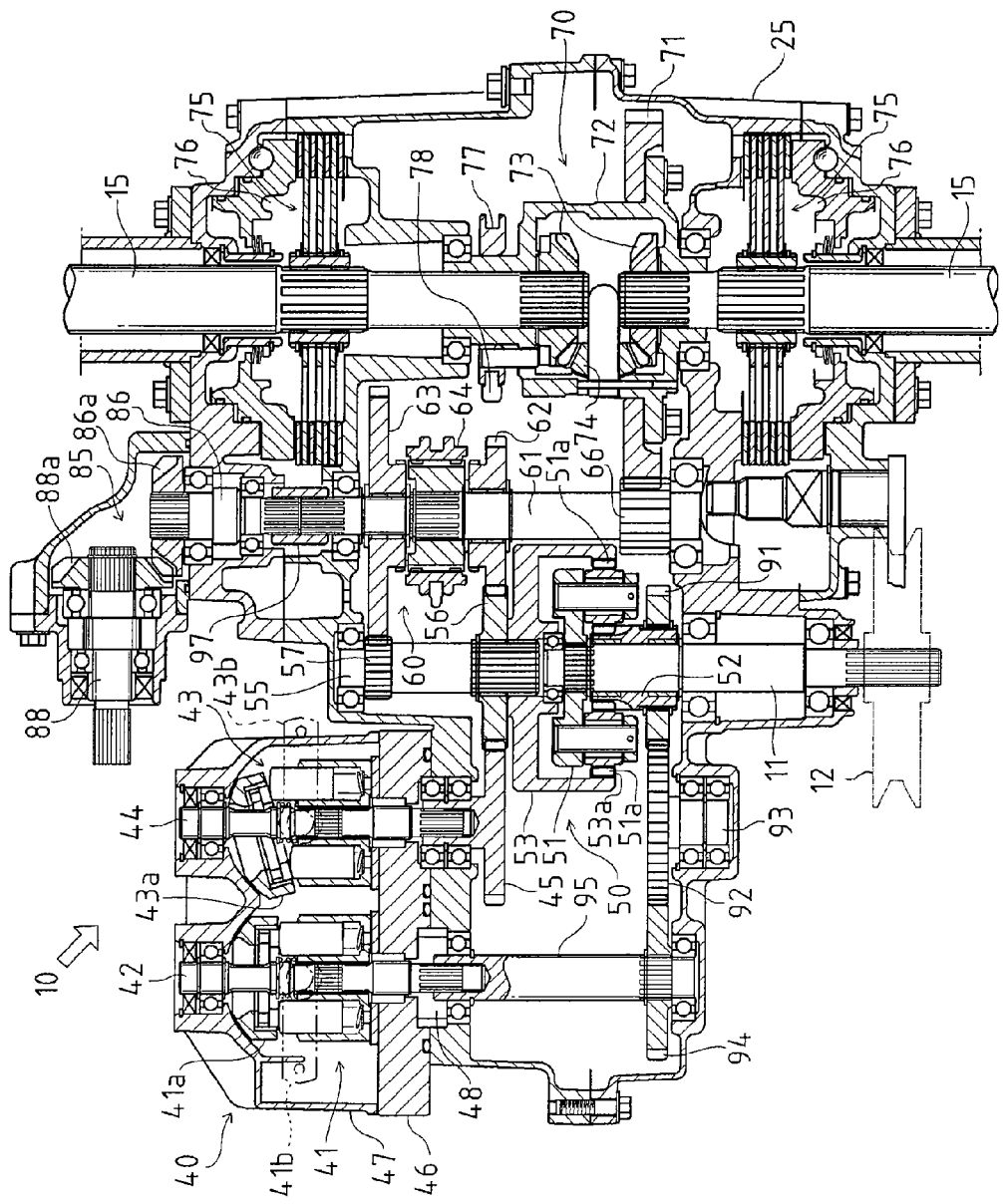
FIG. 3 is a developed sectional plan view of the transmission apparatus according to the first embodiment.
Figure 4:
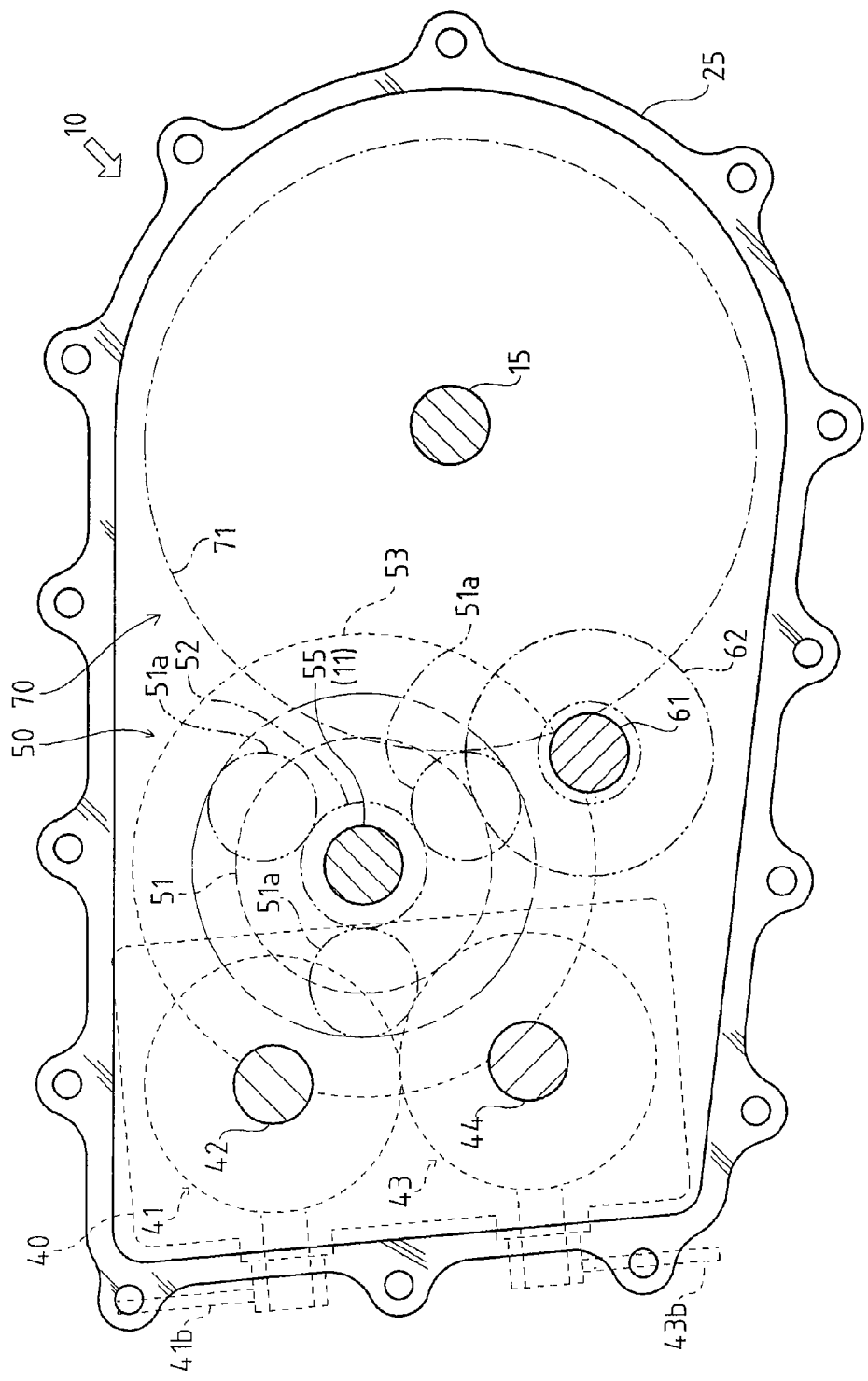
FIG. 4 is a sectional side view of the transmission apparatus according to the first embodiment.

Transmission apparatus 10 according to the first embodiment will be described with reference to FIGS. 3 and 4. Planetary gear assembly 50, auxiliary speed-changing gear assembly 60 and differential gear assembly 70 are disposed in a housing 25, onto which HST 40 is attached.

Input shaft 11, serving as the rotary center shaft of carrier 51, is journalled by housing 25. Pulley 12 is fixed on an outer end of input shaft 11 out of housing 25. In housing 25, carrier 51 is spline-fitted on an inner end of input shaft 11, and sun gear 52 is relatively rotatably provided on input shaft 11.

In housing 25, a laterally horizontal HMT output shaft 55 is rotatably supported coaxially to input shaft 11, and internal gear 53 is spline-fitted onto HMT output shaft 55. Each of planetary gears 51a is pivoted on carrier 51, and mesh with sun gear 52 and internal gear 53.

Sun gear 52 is formed on a sleeve relatively rotatably provided on input shaft 11, on which a gear 91 is fixed. A laterally horizontal counter shaft 93 is journalled in housing 25 in parallel to input shaft 11, and a counter gear 92 fixed on counter shaft 93 meshes with gear 91. A laterally horizontal HST drive shaft 95 is journalled in housing 25 in parallel to counter shaft 93, and a gear 94 is fixed on one end portion of HST drive shaft 95. A pump shaft 42 of hydraulic pump 41 is disposed coaxially to HST drive shaft 95, and spline-fitted into the other end portion of HST drive shaft 95.

HST 40 has a fluid duct plate 46 fixed to housing 25, and an HST housing 47 is fixed onto fluid duct plate 46 opposite to housing 25. In HST housing 47, variable displacement hydraulic pump 41 and variable displacement hydraulic motor 43 are slidably rotatably fitted onto fluid duct plate 46, and mutually fluidly connected through fluid ducts formed in fluid duct plate 46.

Hydraulic pump 41 has pump shaft 42 serving as the rotary axis thereof, which rotatably penetrates fluid duct plate 46 to be spline-fitted into HST drive shaft 95 in housing 25. Hydraulic pump 41 has a movable swash plate 41a disposed in HST housing 47 opposite to fluid duct plate 46. A pump control arm 41b is pivoted by HST housing 47, disposed out of HST housing 47, and interlockingly connected to swash plate 41a in HST housing 47.

A gear type charge pump 48 for supplying fluid to HST 40 is disposed in a chamber formed in mutually joined housing 25 and fluid duct plate 46. Pump shaft 42 (and HST drive shaft 95) serves as a rotary shaft of charge pump 48.

Hydraulic motor 43 has a motor shaft 45 serving as the rotary axis thereof, which is disposed in parallel to pump shaft 42 and rotatably penetrates fluid duct plate 46 to be spline-fitted into a motor output gear 45 in housing 25. Hydraulic motor 43 has a movable swash plate 43a disposed in HST housing 47 opposite to fluid duct plate 46. A motor control arm 43b is pivoted by HST housing 47, disposed out of HST housing 47, and interlockingly connected to swash plate 43a in HST housing 47.

HMT output shaft 55 serves as an auxiliary speed-changing drive shaft, i.e., an input shaft of auxiliary speed-changing gear assembly 60. In this regard, a high speed drive gear 56 is spline-fitted on one end portion of HMT output shaft 55 adjacent to internal gear 53, and meshes with motor output gear 45. A low speed drive gear 57 is formed on the other end portion of HMT output shaft 55.

A laterally horizontal auxiliary speed-changing clutch shaft 61 is journalled in housing 25 in parallel to input shaft 11 and HMT output shaft 55. A high speed clutch gear 62 is relatively rotatably fitted on auxiliary speed-changing clutch shaft 61 and meshes with high speed drive gear 56. A low speed clutch gear 63 is relatively rotatably fitted on auxiliary speed-changing clutch shaft 61 and meshes with low speed drive gear 57.

A spline hub is spline-fitted on auxiliary speed-changing clutch shaft 61 between clutch gears 62 and 63. A clutch slider 64 is axially slidably and not-relatively rotatably fitted on the spline hub, so as to be shiftable among a neutral position, a high speed position, and a low speed position. Clutch slider 64 disposed at the neutral position is separated from both clutch gears 62 and 63 so as to drivingly isolate auxiliary speed-changing clutch shaft 61 from HMT output shaft 55. Clutch slider 64 disposed at the high speed position meshes with high speed clutch gear 62 so as to drivingly connect auxiliary speed-changing clutch shaft 61 to HMT output shaft 55 via the high speed gear train consisting of gears 56 and 62. Clutch slider 64 disposed at the low speed position meshes with low speed clutch gear 63 so as to drivingly connect auxiliary speed-changing clutch shaft 61 to HMT output shaft 55 via the low speed gear train consisting of gears 57 and 63. In this way, auxiliary speed-changing gear assembly 60 is configured so as to provide high and low speed stages.

As a result, the output force of hydraulic motor 43 is inputted into HMT output shaft 55, and distributed between auxiliary speed-changing gear assembly 60 and internal gear 53 of planetary gear assembly 50. Planetary gears 51a combine the distributed force into internal gear 53 with the input force of carrier 51 and input shaft 11, and transmit the resultant force to sun gear 52 so as to drive hydraulic pump 41. In other words, the rotary force of input shaft 11 driven by engine 3 is transmitted to hydraulic pump 41 with the help of the rotary force of planetary gear assembly 50 distributed from hydraulic motor 43, whereby hydraulic pump 41 and motor 43 can be small-sized.

Auxiliary speed-changing clutch shaft 61 is formed thereon with a final pinion 66, which meshes with a bull gear 71 of differential gear assembly 70. Referring to differential gear assembly 70, bull gear 71 is fixed on a differential casing 72 rotatably supporting left and right rear axles 15. In differential casing 72, a differential side gear 73 is fixed on a proximal end of each of axles 15, and meshes with a differential pinion 74 pivoted by differential casing 72. In this way, differential gear assembly 70 differentially connects axles 15 to each other, and transmits the output force of auxiliary speed-changing gear assembly 60 to axles 15.

Further, a differential locking slider 77 is axially slidably fitted on differential casing 72. A differential locking pin 78 is fixed to differential locking slider 77 and penetrates a wall of differential casing 72. When differential locking slider 77 is disposed at a differential locking position, differential locking pin 78 is further inserted into differential casing 72, and engaged into one of differential side gears 73, thereby locking axles 15 to each other.

In housing 25, a pair of left and right brake chambers 76 are formed on opposite sides of differential gear assembly 70 around respective axles 15, and brakes 75 are provided on respective axles 15 in respective brake chambers 76.

A front wheel driving PTO gear chamber 85 is formed on an outside of housing 25. A first front wheel driving PTO shaft 86 is journalled by housing 25 coaxially to auxiliary speed-changing clutch shaft 61 opposite to final pinion 66. In housing 25, a spline collar 97 is spline-fitted on facing ends of shafts 61 and 86 so as to integrally rotatably connect shafts 61 and 86 to each other. In chamber 85, a bevel gear 86a is spline-fitted on shaft 86. A second front wheel driving PTO shaft 88 is disposed in the fore-and-aft direction of cart 1 and journalled at the rear end portion thereof in chamber 85. In chamber 85, a bevel gear 88a is spline-fitted on shaft 88 and meshes with bevel gear 86a. Second front wheel driving PTO shaft 88 projects forward from chamber 85 to be drivingly connected to front transaxle 80 for driving front wheels 4 via propeller shaft 9 and the universal joints (see FIG. 2).

Left and right front axles 14 are differentially connected to each other via differential gear assembly in front transaxle 80. Front wheels 4 are suspended from respective front axles 14 and drivingly connected to respective front axles 14 via universal joints and transmission shafts, respectively.

Characteristic arrangements of shafts in transmission apparatus 10 and advantages thereof will be described.

Planetary gear assembly 50 is disposed coaxially to input shaft 11 of the HMT. That is, carrier 51 is fixed on input shaft 11, sun gear 52 is relatively rotatably provided on input shaft 11, and internal gear 53 is fixed on HMT output shaft 55 disposed coaxially to input shaft 11. Due to this arrangement, a space in transmission apparatus 10 for planetary gear assembly 50 relative to input shaft 11 (in the radial direction of input shaft 11) can be reduced.

Pump shaft 42 and motor shaft 44 are disposed on one of front and rear sides of input shaft 11, and axles 15 are disposed on the other rear or front side of input shaft 11. More specifically, pump shaft 42 and motor shaft 44 are disposed in front of input shaft 11, and axles 15 are disposed behind input shaft 11. This fore-and-aft distribution of shafts 42, 44, and 11 and axles 15 is advantageous in vertically minimizing transmission apparatus 10. Vertically minimized transmission apparatus 10 can ensure a large volume of cargo deck 8 thereabove, and can stably lower the gravity center of cart 1.

Input shaft 11, pump shaft 42, motor shaft 44 and axles 15 are disposed in parallel. More specifically, shafts 11, 42, and 44 and axles 15 are disposed laterally horizontally. This parallel arrangement of shafts 11, 42, and 44 and axles 15 is advantageous in minimizing transmission apparatus 10 in the radial direction of axles 15, typically in the fore-and-aft direction or vertically.

Pump shaft 42 and motor shaft 44 are disposed above and below when viewed in axial section. More specifically, referring to FIG. 4, pump shaft 42 is disposed above motor shaft 44. This vertical distribution of shafts 42 and 44 is advantageous in minimizing transmission apparatus 10 in the fore-and-aft direction and in the axial direction of axles 15, i.e., laterally, even in the state where gear 94 is fixed on HST drive shaft 95 coaxially extended from pump shaft 42, and gear 45 is fixed on motor shaft 44.

Input shaft 11 is different in height from axles 15. More specifically, referring to FIG. 4, input shaft 11 is higher than axles 15. This vertical offset of shafts 11 and 15 is advantageous in reducing a space between input shaft 11 and axles 15 in the fore-and-aft direction.

Auxiliary speed-changing gear assembly 60, drivingly interposed between the HMT and differential gear assembly 70, includes auxiliary speed-changing clutch shaft 61 disposed between input shaft 11 and axles 15 in parallel. This parallel arrangement of shafts 61 and 11 and axles 15 is advantageous in vertically minimizing transmission apparatus 10.

Further, auxiliary speed-changing clutch shaft 61 is different in height from a line interposed center axes of input shaft 11 and axles 15. More specifically, referring to FIG. 4, auxiliary speed-changing clutch shaft 61 is disposed lower the line. This arrangement of shaft 61 relative to shaft 11 and axles 15 is advantageous in reducing a space between input shaft 11 and axles 15 in the fore-and-aft direction.

In this way, transmission apparatus 10 having the above-mentioned layout of shafts therein can be minimized so as to expand a space thereabove for cargo deck 8. Therefore, a bottom of cargo deck 8 can be lowered for easy loading onto (or unloading from) cargo deck 8, and for stably lowering a center of gravity in cart 1. Further, vertically minimized transmission apparatus 10 can expand a space therebelow for increasing the road clearance of cart 1.

As mentioned above, the HMT of transmission apparatus 10 belongs to the input dividing type, wherein a neutral position of movable swash plate 41a of hydraulic pump 41 corresponds to a zero point of output speed of hydraulic motor 43 and a zero point of traveling speed of cart 1. Further, in the HMT, movable swash plate 43a of hydraulic motor 43 is moved to reduce a displacement of hydraulic motor 43 after movable swash plate 41a reaches a maximum tilt angle in each of opposite tilt directions for forward and backward traveling of cart 1 from the neutral position of swash plate 41a.

Figure 5:
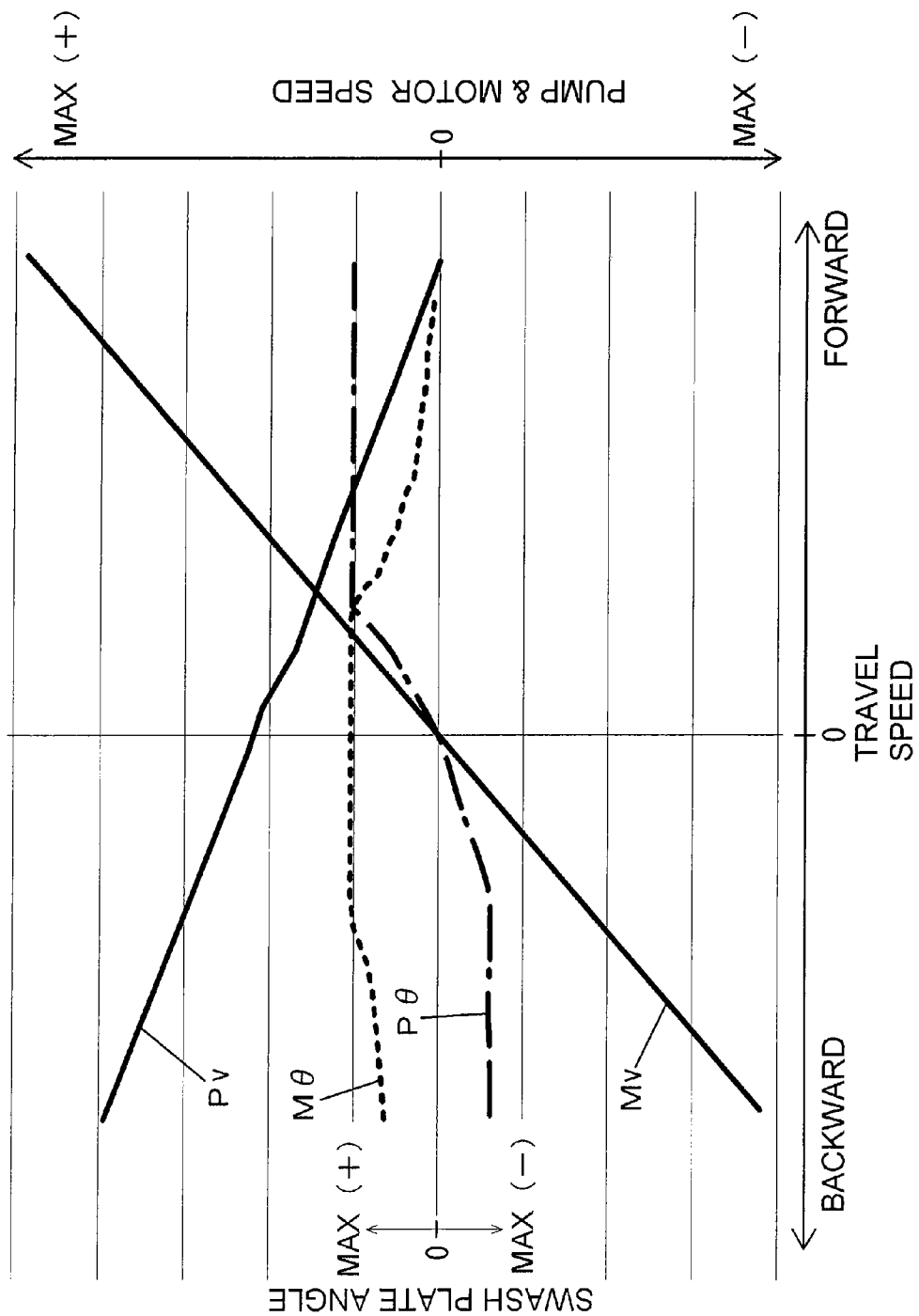
FIG. 5 illustrates a control result of the input dividing type HMT, including graphs of pump and motor speeds and of swash plate angle relative to forward and backward travel speed of the cart.

Referring to FIG. 5, the control result of the HMT will be described. A graph Pθ designates a pump swash plate angle, i.e., a tilt angle of movable swash plate 41a, relative to a travel speed and direction of cart 1. The pump swash plate angle in the tilt direction for forward traveling of cart 1 is positive, and that in the tilt angle for backward traveling of cart 1 is negative. When the pump swash plate angle is zero, i.e., when swash plate 41a is disposed at the neutral position, hydraulic pump 41 delivers no fluid. As each of the positive and negative pump swash plate angles is increased from zero, the fluid delivered from hydraulic pump 41 is increased so as to increase the rotary speed of motor shaft 44 in each of the forward and backward traveling directions, so that each of the forward and backward travel speeds of cart 1 is increased.

A graph Mθ designates a motor swash plate angle, i.e., a tilt angle of movable swash plate 43a, relative to a travel speed and direction of cart 1. The motor swash plate angle is constantly positive, i.e., the whole motor swash plate angle range is disposed within the tilt direction for forward traveling of cart 1. While the pump swash plate angle is disposed in the variation range, the maximum motor swash plate angle is kept. After each of the positive and negative pump swash plate angles reaches the maximum, the motor swash plate angle is reduced so as to reduce the displacement of hydraulic motor 43, thereby increasing the rotary speed of motor shaft 44, so that each of the forward and backward travel speeds of cart 1 is increased.

A graph Mv designates a motor speed, i.e., a rotary speed of motor shaft 44. Due to the control of pump and motor swash plates 41a and 43a represented by graphs Pθ and Mθ, graph Mv arises by a constant rate, i.e., the motor speed in rotation for backward traveling is decreased from the maximum for backward traveling to zero, and the motor speed in rotation for forward traveling is increased from zero to the maximum for forward traveling, in proportion to change of travel speed of cart 1 from the maximum backward traveling speed to the maximum forward traveling speed. When the pump swash plate angle is zero, the motor speed and the vehicle traveling speed are zeroed. This means that, when the forward and backward traveling direction of the vehicle is changed, hydraulic motor 43, auxiliary speed-changing gear assembly 60, and axles 15 are stationary so as to reduce shock of the vehicle.

A graph Pv designates a pump speed, i.e., a rotary speed of pump shaft 42. Due to the effect of the HMT, i.e., the assist of planetary gear assembly 50, graph Pv is decreased by a constant rate from the maximum to zero in proportion to change of travel speed of cart 1 from the maximum backward traveling speed to the maximum forward traveling speed. In this way, when cart 1 travels forward at high speed, the torque of pump shaft 42 can be saved. This is advantageous in minimization of hydraulic pump 41.

In comparison with a belt type CVT, the HMT in transmission apparatus 10 has the advantage of requiring no mechanical reverser required for the belt type CVT, because the HMT uses an angle change of pump swash plate 41a for changing the forward and backward traveling direction of a vehicle. Due to the HMT, a vehicle can be steplessly speed-changed, and can be free from such a shock that occurs when the reverser is changed for changing the traveling direction of a vehicle. Further, in comparison with the belt type CVT, the HMT has high power transmission efficiency so as to save energy cost.

Figure 6:
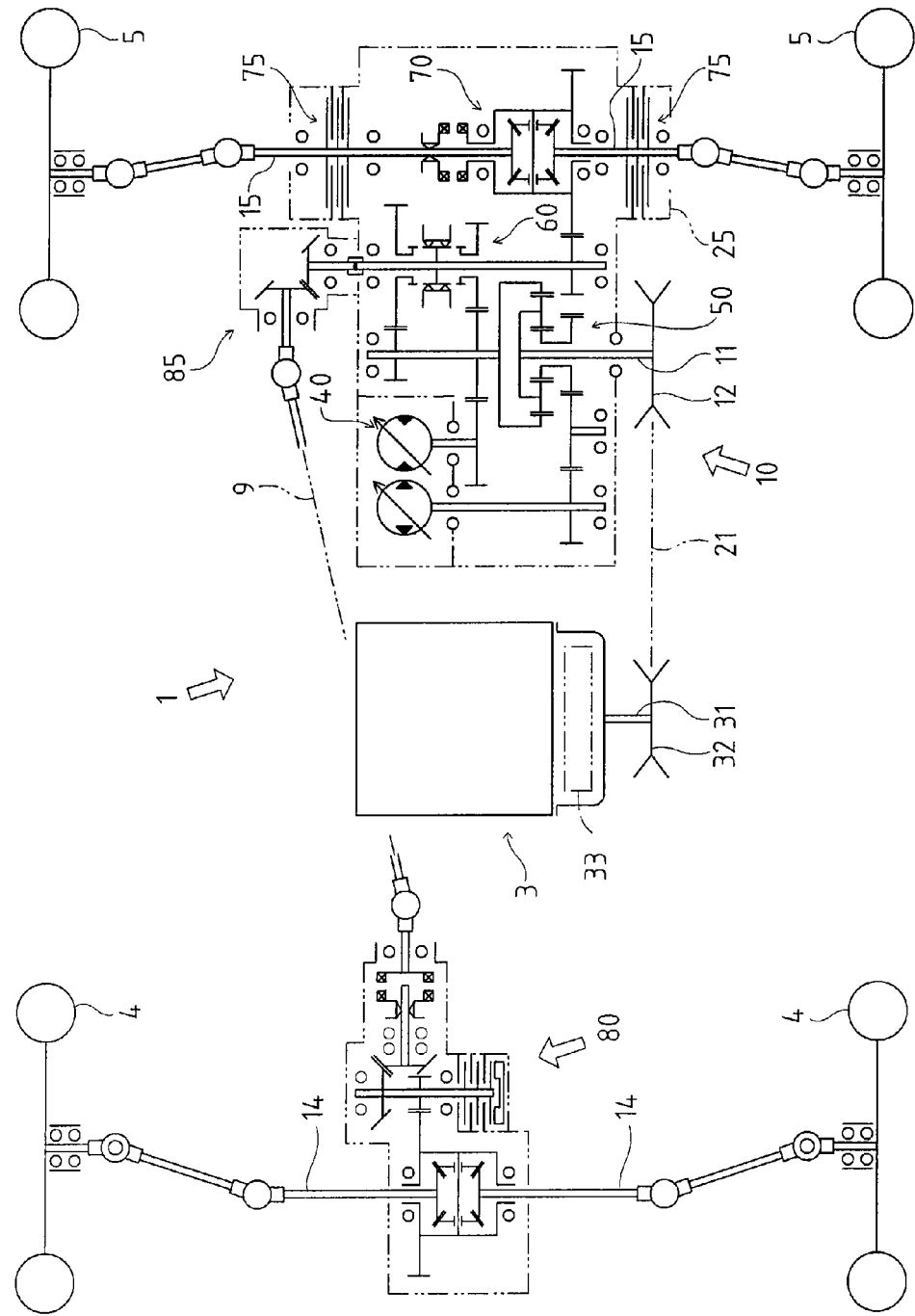
FIG. 6 is a diagram of another mechanical and hydraulic drive system of the cart including the transmission apparatus according to the first embodiment, wherein rear wheels are drivingly connected to respective axles via universal joints and transmission shafts.

FIG. 6 illustrates cart 1, which is the same as that shown in FIGS. 1 and 2, excluding that left and right rear wheels 5 drivingly connected to respective axles 15 are suspended from respective axles 15 via universal joints and transmission shafts.

Figure 7:
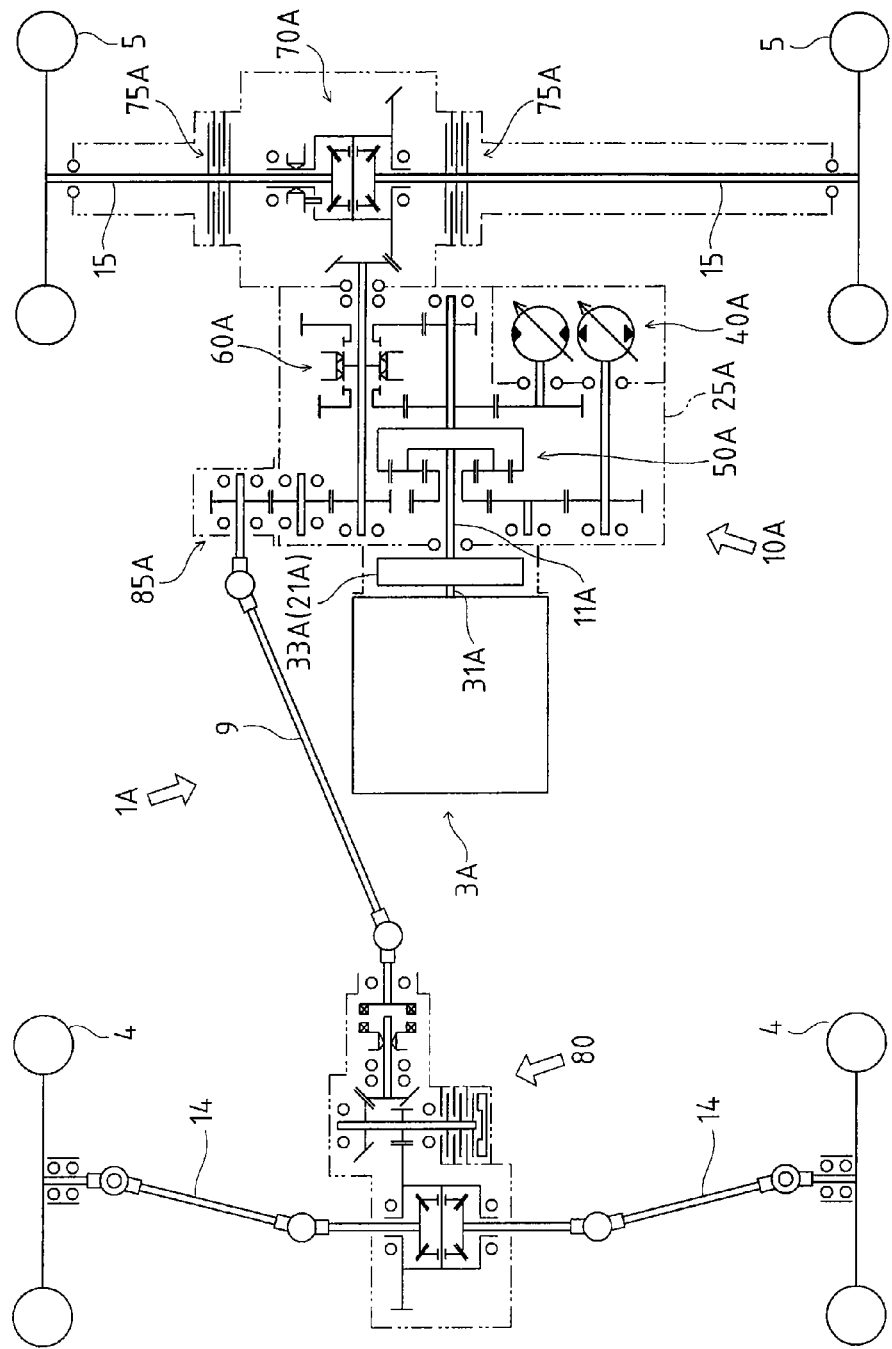
FIG. 7 is a diagram of another mechanical and hydraulic drive system of the cart equipped with a transmission apparatus including an HMT according to a second embodiment.
Figure 8:
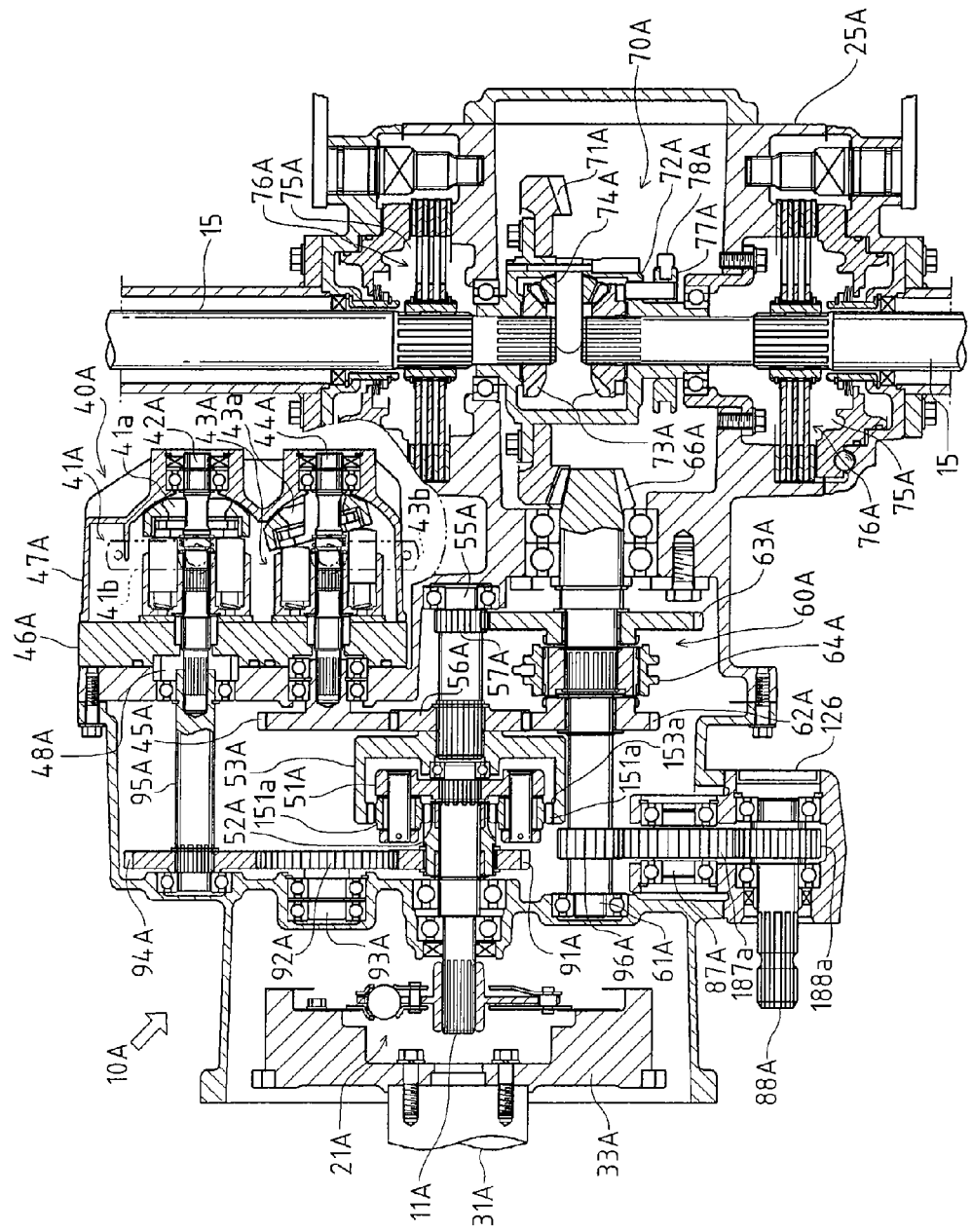
FIG. 8 is a developed sectional plan view of the transmission apparatus according to the second embodiment.
Figure 9:
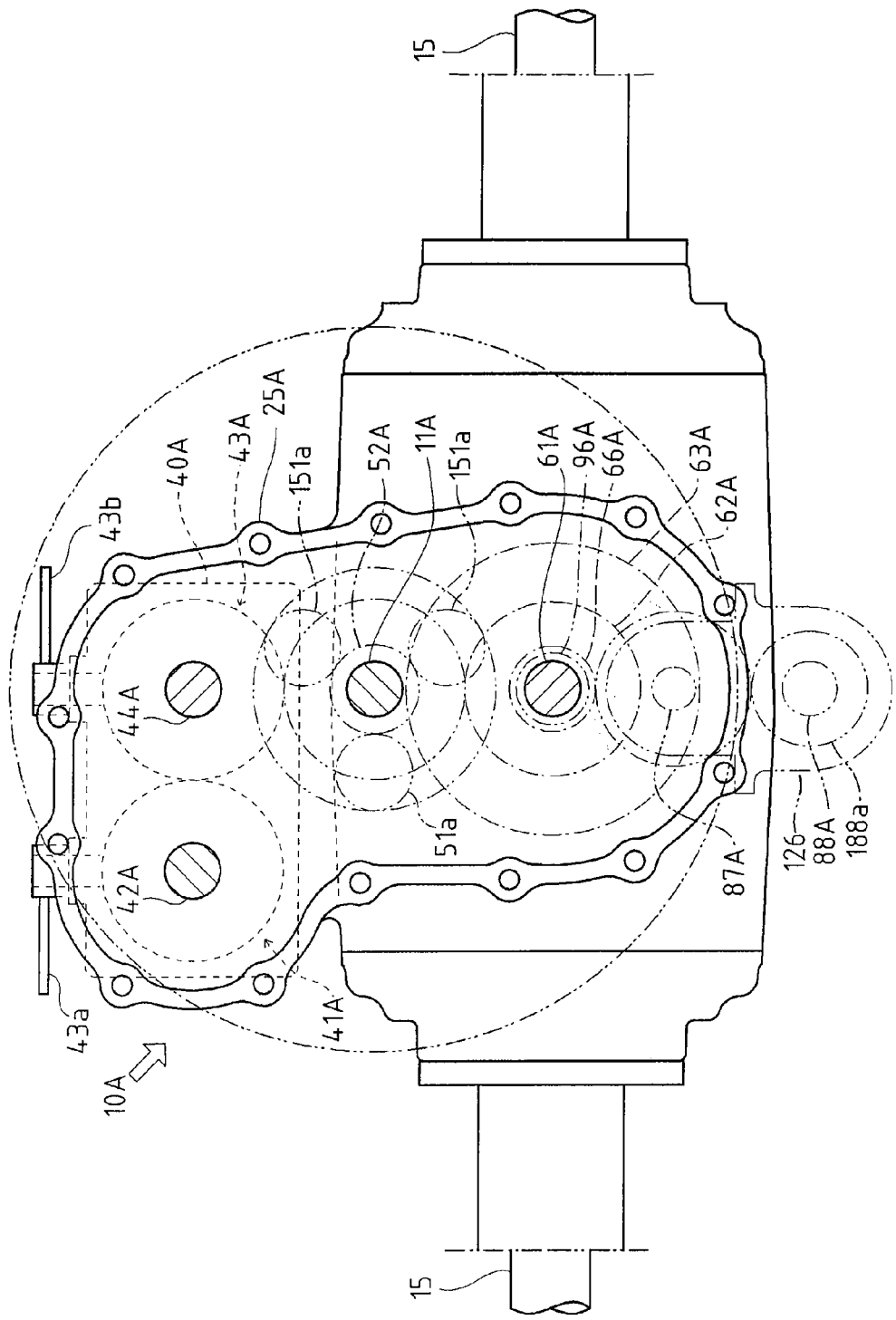
FIG. 9 is a sectional side view of the transmission apparatus according to the second embodiment.

Referring to FIGS. 7 to 9, a cart 1A equipped with a transmission apparatus 10A according to a second embodiment will be described.

As shown in FIG. 7, cart 1A has a power train from an engine 3A to rear wheels 5 via transmission apparatus 10A. Further, cart 1A has a power train from transmission apparatus 10A to front wheels 4 via propeller shaft 9 and front transaxle 80.

Engine 3A has a rearwardly extended output shaft 31A, and transmission apparatus 10A has a forwardly extended input shaft 11A coaxial to engine output shaft 31A. As shown in FIG. 8, a flywheel 33A is fixed onto the rear end of engine output shaft 31A. A front end portion of a housing 25A is extended forward and connected to the rear end of engine 3A so as to cover flywheel 33A. In the front end portion of housing 25A, a front end portion of input shaft 11A is extended forward and drivingly connected to flywheel 33A via a main clutch 21A.

As shown in FIGS. 7 and 8, transmission apparatus 10A includes an HST 40A and a planetary gear assembly 50A, which are combined to constitute an HMT. The HMT belongs to the input dividing type, such that the rotary force of input shaft 11A is distributed between planetary gear assembly 50A and HST 40A. Planetary gear assembly 50A has a planetary carrier 51A, whose rotary center axis is input shaft 11A for receiving power of engine 3A via main clutch 21A. Planetary gears 151a pivoted on carrier 51A mesh with a sun gear 52A for driving a hydraulic pump 41A of HST 40A, and mesh with an internal gear 53A for receiving an output force of a hydraulic motor 43A of HST 40A.

Transmission apparatus 10A according to the second embodiment will be described with reference to FIGS. 7 and 8. Planetary gear assembly 50A, an auxiliary speed-changing gear assembly 60A and a differential gear assembly 70A are disposed in housing 25A, onto which HST 40A is attached.

Input shaft 11A, serving as the rotary center shaft of carrier 51A, is journalled by housing 25A. In housing 25A, carrier 51A is spline-fitted on a rear end of input shaft 11A, and sun gear 52A is relatively rotatably provided on input shaft 11A.

In housing 25A, a fore-and-aft horizontal HMT output shaft 55A is rotatably supported coaxially to input shaft 11A, and internal gear 53A is spline-fitted onto HMT output shaft 55A. Each of planetary gears 151a is pivoted on carrier 51A, and mesh with sun gear 52A and internal gear 53A.

Sun gear 52A is formed on a sleeve relatively rotatably provided on input shaft 11A, on which a gear 91A is fixed. A fore-and-aft horizontal counter shaft 93A is journalled in housing 25A in parallel to input shaft 11A, and a counter gear 92A fixed on counter shaft 93A meshes with gear 91A. A fore-and-aft horizontal HST drive shaft 95A is journalled in housing 25A in parallel to counter shaft 93A, and a gear 94A is fixed on one end portion of HST drive shaft 95A. A pump shaft 42A of hydraulic pump 41A is disposed coaxially to HST drive shaft 95A, and spline-fitted into the other end portion of HST drive shaft 95A.

HST 40A has a fluid duct plate 46A fixed to housing 25A, and an HST housing 47A is fixed onto fluid duct plate 46A so as to extend rearward from fluid duct plate 46A. In HST housing 47A, variable displacement hydraulic pump 41A and variable displacement hydraulic motor 43A are slidably rotatably fitted onto fluid duct plate 46A, and mutually fluidly connected through fluid ducts formed in fluid duct plate 46A.

Hydraulic pump 41A has pump shaft 42A serving as the rotary axis thereof, which rotatably penetrates fluid duct plate 46A to be spline-fitted into HST drive shaft 95A in housing 25A. Hydraulic pump 41A has movable swash plate 41a disposed in HST housing 47A opposite to fluid duct plate 46A. Pump control arm 41b is pivoted by HST housing 47A, disposed out of HST housing 47A, and interlockingly connected to swash plate 41a in HST housing 47A.

A gear type charge pump 48A for supplying fluid to HST 40A is disposed in a chamber formed in mutually joined housing 25A and fluid duct plate 46A. Pump shaft 42A (and HST drive shaft 95A) serves as a rotary shaft of charge pump 48A.

Hydraulic motor 43A has a motor shaft 44A serving as the rotary axis thereof, which is disposed in parallel to pump shaft 42A and rotatably penetrates fluid duct plate 46A to be spline-fitted into a motor output gear 45A in housing 25A. Hydraulic motor 43A has movable swash plate 43a disposed in HST housing 47A opposite to fluid duct plate 46A. Motor control arm 43b is pivoted by HST housing 47A, disposed out of HST housing 47A, and interlockingly connected to swash plate 43a in HST housing 47A.

HMT output shaft 55A serves as an auxiliary speed-changing drive shaft, i.e., an input shaft of auxiliary speed-changing gear assembly 60A. In this regard, a high speed drive gear 56A is spline-fitted on one end portion of HMT output shaft 55A adjacent to internal gear 53A, and meshes with motor output gear 45A. A low speed drive gear 57A is formed on the other end portion of HMT output shaft 55A.

A fore-and-aft horizontal auxiliary speed-changing clutch shaft 61A is journalled in housing 25A in parallel to input shaft 11A and HMT output shaft 55A. A high speed clutch gear 62A is relatively rotatably fitted on auxiliary speed-changing clutch shaft 61A and meshes with high speed drive gear 56A. A low speed clutch gear 63A is relatively rotatably fitted on auxiliary speed-changing clutch shaft 61A and meshes with low speed drive gear 57A.

A spline hub is spline-fitted on auxiliary speed-changing clutch shaft 61A between clutch gears 62A and 63A. A clutch slider 64A is axially slidably and not-relatively rotatably fitted on the spline hub, so as to be shiftable among a neutral position, a high speed position, and a low speed position. Clutch slider 64A disposed at the neutral position is separated from both clutch gears 62A and 63A so as to drivingly isolate auxiliary speed-changing clutch shaft 61A from HMT output shaft 55A. Clutch slider 64A disposed at the high speed position meshes with high speed clutch gear 62A so as to drivingly connect auxiliary speed-changing clutch shaft 61A to HMT output shaft 55A via the high speed gear train consisting of gears 56A and 62A. Clutch slider 64A disposed at the low speed position meshes with low speed clutch gear 63A so as to drivingly connect auxiliary speed-changing clutch shaft 61A to HMT output shaft 55A via the low speed gear train consisting of gears 57A and 63A. In this way, auxiliary speed-changing gear assembly 60A is configured so as to provide high and low speed stages.

As a result, the output force of hydraulic motor 43A is inputted into HMT output shaft 55A, and distributed between auxiliary speed-changing gear assembly 60A and internal gear 53A of planetary gear assembly 50A. Planetary gears 151a combine the distributed force into internal gear 53A with the input force of carrier 51A and input shaft 11A, and transmit the resultant force to sun gear 52A so as to drive hydraulic pump 41A. In other words, the rotary force of input shaft 11A driven by engine 3A is transmitted to hydraulic pump 41A with the help of the rotary force of planetary gear assembly 50A distributed from hydraulic motor 43A, whereby hydraulic pump 41A and motor 43A can be small-sized.

Auxiliary speed-changing clutch shaft 61A is formed on the rear end thereof with a bevel final pinion 66A, which meshes with a bevel bull gear 71A of differential gear assembly 70A. Referring to differential gear assembly 70A, bull gear 71A is fixed on a differential casing 72A rotatably supporting left and right rear axles 15. In differential casing 72A, a differential side gear 73A is fixed on a proximal end of each of axles 15, and meshes with a differential pinion 74A pivoted by differential casing 72A. In this way, differential gear assembly 70A differentially connects axles 15 to each other, and transmits the output force of auxiliary speed-changing gear assembly 60A to axles 15.

Further, a differential locking slider 77A is axially slidably fitted on differential casing 72A. A differential locking pin 78A is fixed to differential locking slider 77A and penetrates a wall of differential casing 72A. When differential locking slider 78A is disposed at a differential locking position, differential locking pin 78A is further inserted into differential casing 72A, and engaged into one of differential side gears 73A, thereby locking axles 15 to each other.

In housing 25A, a pair of left and right brake chambers 76A are formed on opposite sides of differential gear assembly 70A around respective axles 15, and brakes 75A are provided on respective axles 15 in respective brake chambers 76A.

Axles 15 are extended laterally outward from housing 25A so as to be connected at distal ends thereof to center portions of rear wheels 5. Alternatively, rear wheels 5 may be suspended from axles 15 via universal joints and transmission shafts, as shown in FIG. 6.

A front wheel driving PTO gear casing 126 is fixed onto an outside of housing 25A. In front wheel driving PTO gear casing 126, a fore-and-aft horizontal front wheel driving PTO shaft 88A is journalled, and a gear 188a is fixed on front wheel driving PTO shaft 88A. Front wheel driving PTO shaft 88A projects forward from front wheel driving PTO gear casing 126 so as to be drivingly connected to front transaxle 80 for driving front wheels 4 via propeller shaft 9 and the universal joints (see FIG. 7).

An intermediate shaft 87A is journalled in housing 25A between auxiliary speed-changing clutch shaft 61A and front wheel driving PTO shaft 88A in parallel. An intermediate gear 187a is fixed on intermediate shaft 87A and meshes with a gear 96A fixed (or integrally formed) on auxiliary speed-changing clutch shaft 61A. Intermediate gear 187a also meshes with gear 188a. In this way, a gear train for driving front wheels 4 consisting of gears 96A, 187a and 188a is disposed laterally between housing 25 and front wheel driving PTO gear casing 126.

Left and right front axles 14 are differentially connected to each other via differential gear assembly in front transaxle 80, and front wheels 4 are suspended from respective front axles 14 via universal joints, respectively.

Characteristic arrangements of shafts in transmission apparatus 10A and advantages thereof will be described.

Planetary gear assembly 50A is disposed coaxially to input shaft 11A of the HMT. That is, carrier 51A is fixed on input shaft 11A, sun gear 52A is relatively rotatably provided on input shaft 11A, and internal gear 53A is fixed on HMT output shaft 55A disposed coaxially to input shaft 11A. Due to this arrangement, a space in transmission apparatus 10A for planetary gear assembly 50A relative to input shaft 11A (in the radial direction of input shaft 11A) can be reduced.

Pump shaft 42A and motor shaft 44A are disposed on one of upper and lower sides of input shaft 11A, and axles 15 are disposed on the other lower or upper side of input shaft 11A. More specifically, referring to FIG. 9, pump shaft 42A and motor shaft 44A are disposed above input shaft 11A, and axles 15 are disposed below input shaft 11A. This vertical distribution of shafts 42A, 44A, 11A and 15 is advantageous in minimizing transmission apparatus 10A in the axial direction of axles 15, i.e., laterally.

Input shaft 11A, pump shaft 42A and motor shaft 44A are disposed in parallel and in perpendicular to axles 15. More specifically, referring to FIG. 9, input shaft 11A, pump shaft 42A and motor shaft 44A are disposed in the fore-and-aft direction of transmission apparatus 10A while axles 15 are disposed laterally. This arrangement of shafts 11A, 42A and 44A relative to axles 15 is advantageous in minimizing transmission apparatus 10A in the fore-and-aft direction, even in the state where gear 94A is fixed on HST drive shaft 95A coaxially extended from pump shaft 42A, and gear 45A is fixed on motor shaft 44A.

As shown in FIG. 9, pump shaft 42A and motor shaft 44A are substantially leveled with each other when viewed in axial section. This arrangement of shafts 42A and 44A is advantageous in vertically minimizing transmission apparatus 10A.

As mentioned above, referring to FIGS. 7 and 8, input shaft 11A is disposed coaxially to engine output shaft 31A. More specifically, input shaft 11A and engine output shaft 31A are coaxially disposed horizontally in the fore-and-aft direction. Due to this arrangement of shafts 11A and 31A, input shaft 11A can be drivingly connected to engine output shaft 31A via main clutch 21A instead of a belt and pulleys, thereby reducing power loss.

In auxiliary speed-changing gear assembly 60A, drivingly interposed between the HMT and differential gear assembly 70A, auxiliary speed-changing clutch shaft 61A is disposed between input shaft 11A and axles 15 in parallel to input shaft 11A. This arrangement of shafts 61A and 11A and axles 15 is advantageous in minimizing transmission apparatus 10A in the radial direction of shaft 61A, i.e., laterally.

Further, referring to FIG. 9, HST 40A is disposed above input shaft 11A, auxiliary speed-changing clutch shaft 61A is disposed below input shaft 11A, and input shaft 11A is substantially leveled with axles. This arrangement is advantageous in ensuring a large ground clearance below transmission apparatus 10A.

The effect of the input dividing type HMT in transmission apparatus 10A is the same as that in transmission apparatus 10.

Figure 10:
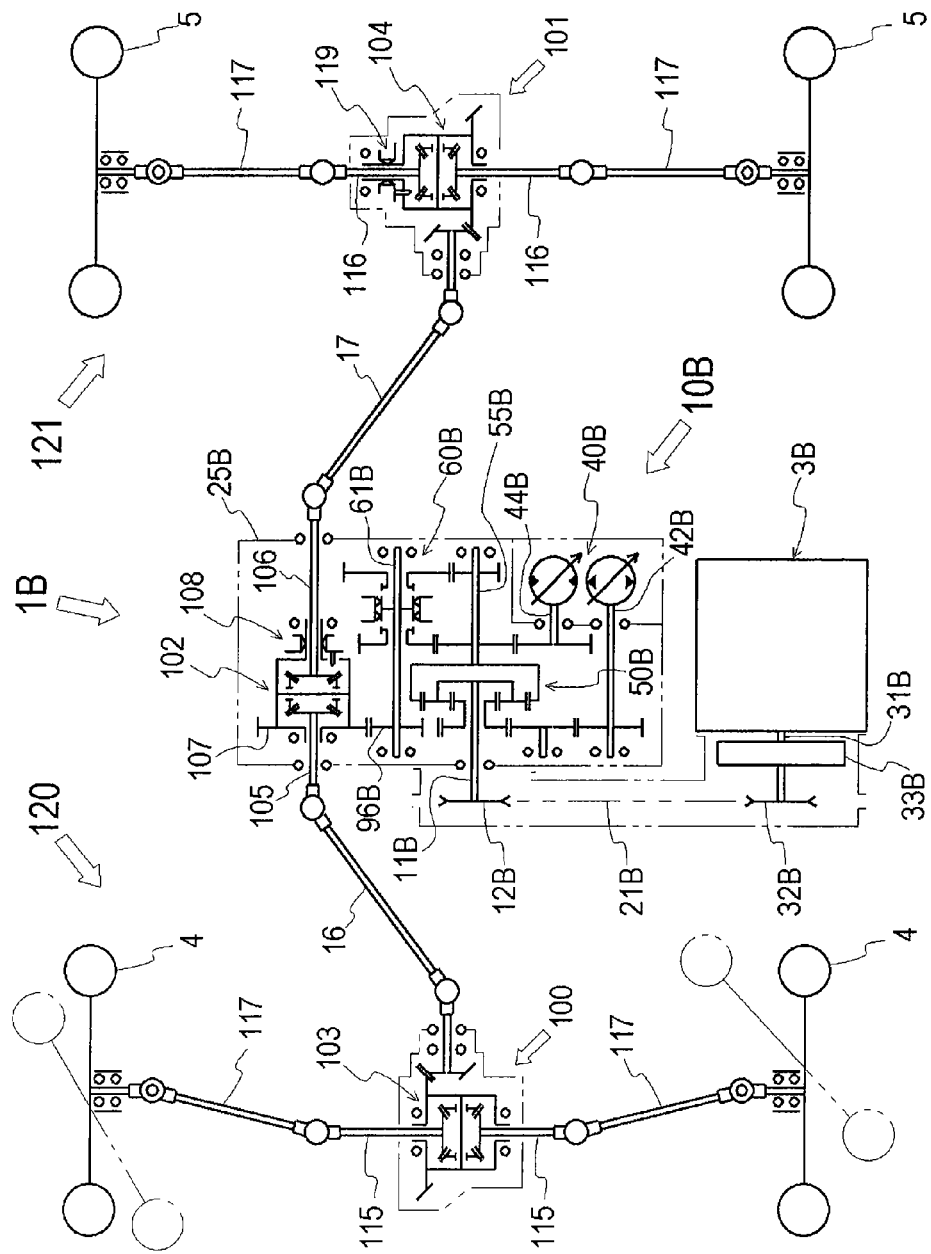
FIG. 10 is a diagram of another mechanical and hydraulic drive system of the cart equipped with a transmission apparatus including an HMT according to a third embodiment.
Figure 11:
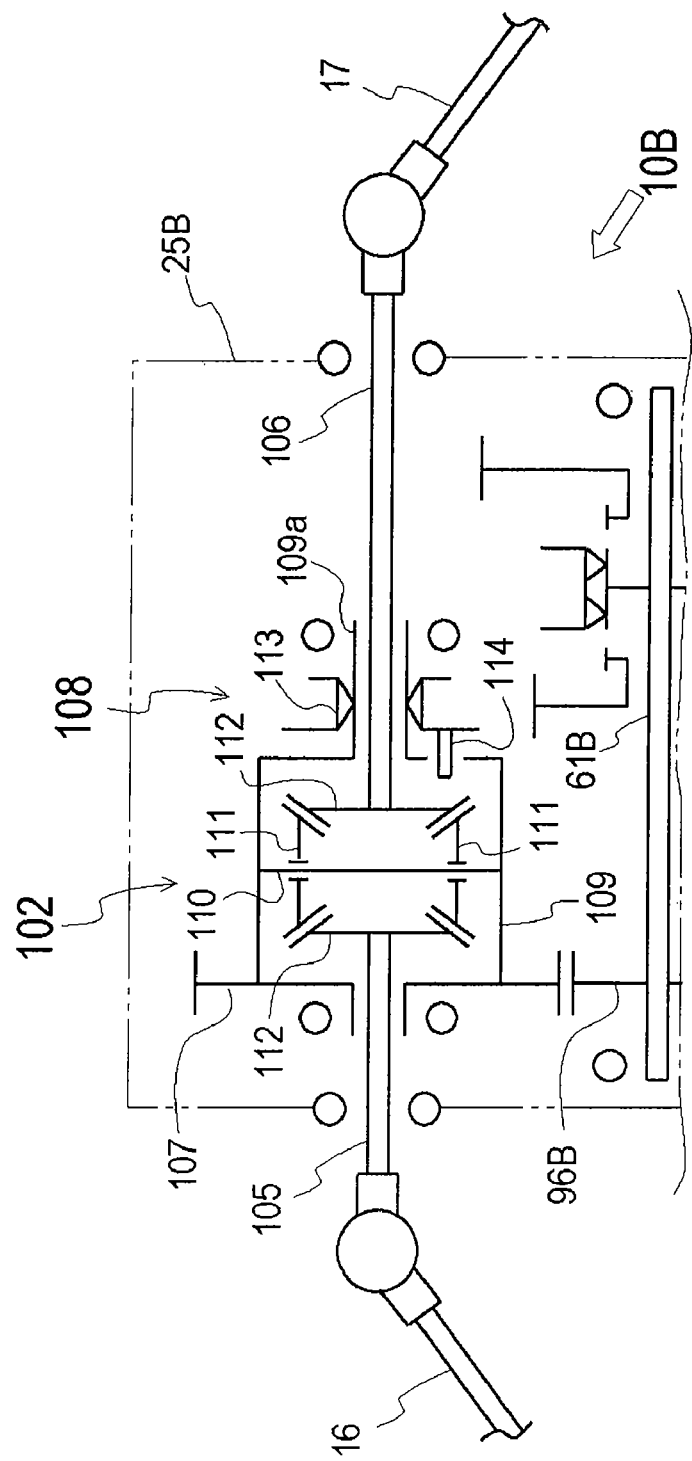
FIG. 11 is a diagram of a center differential gear unit in the transmission apparatus according to the third embodiment.

Referring to FIGS. 10 and 11, a cart 1B equipped with a transmission apparatus 10B including the HMT according to a third embodiment will be described.

As shown in FIG. 10, an engine 3B and a central transmission apparatus 10B are juxtaposed left and right (or upper and lower, if possible) at the longitudinal intermediate portion of cart 1B. Due to the lateral (or vertical) distribution of engine 3B and transmission apparatus 10B, cart 1B is minimized lengthwise.

A front transaxle 100 differentially and steerably supporting left and right front wheels 4 is disposed in front of transmission apparatus 10B and drivingly connected to transmission apparatus 10B via a front propeller shaft 16 and universal joints. A rear transaxle 101 differentially and unsteerably supporting left and right rear wheels 5 is disposed behind transmission apparatus 10B and drivingly connected to transmission apparatus 10B via a rear propeller shaft 17 and universal joints.

Driving connection between engine 3B and transmission apparatus 10B will be described with reference to FIG. 10. An engine output shaft 31B is extended forward from engine 3B via a flywheel 33B. A main clutch may be interposed between flywheel 33B and engine output shaft 31B. An input shaft 11B of transmission apparatus 10B projects forward from a housing 25B of transmission apparatus 10B. A pulley 32B is fixed onto a front end of engine output shaft 31B, and a pulley 12B onto a front end of input shaft 11B. A belt 21B is looped over pulleys 32B and 12B so as to transmit power of engine 3B to transmission apparatus 10B.

In housing 25B, a planetary gear assembly 50B is disposed coaxially to input shaft 11B and drivingly connected to input shaft 11B. Planetary gear assembly 50B is drivingly interposed between shafts 11B and 55B. An HST 40B including a hydraulic pump 41B and a hydraulic motor 43B is attached onto housing 25B. In housing 25B, an HMT output shaft 55B is disposed coaxially to input shaft 11B and behind input shaft 11B, and drivingly connected to hydraulic motor 43B. Similar to planetary assemblies 50 and 50A, planetary gear assembly 50B includes a sun gear, an internal gear, a carrier, and planetary gears pivoted on the carrier between the sun gear and the carrier. The carrier is fixed on input shaft 11B, the sun gear is relatively rotatably provided on input shaft 11B and interlockingly connected to hydraulic pump 41B, and the internal gear is fixed onto HMT output shaft 55B. In this way, planetary gear assembly 50B also belongs to the input dividing type.

An auxiliary speed-changing clutch shaft 61B is disposed in parallel to HMT output shaft 55B, and an auxiliary speed-changing gear assembly 60B is drivingly interposed between HMT output shaft 55B and auxiliary speed-changing clutch shaft 61B. In this way, in transmission apparatus 10B, the HMT and auxiliary speed-changing gear assembly 60B are drivingly interposed in series between input shaft 11B and auxiliary speed-changing clutch shaft 61B. Auxiliary speed-changing gear assembly 60B and HST 40B are distributed opposite to each other (e.g., vertically in the same way as those of transmission apparatus 10A) with respect to shafts 11B and 55B in the axial view of shafts 11B and 55B.

Description of arrangement of parts (such as shafts and gears) of the HMT and auxiliary speed-changing gear assembly 60B in housing 25B of transmission apparatus 10B and advantages of the arrangement are omitted because they are represented by the above description of transmission apparatus 10A.

To distribute the output of auxiliary speed-changing gear assembly 60B, i.e., the torque of auxiliary speed-changing clutch shaft 61B between front and rear transaxles 100 and 101, a center differential gear assembly 102 with a differential locking assembly 108 is disposed in housing 25B of transmission apparatus 10B. In this regard, an output gear 96B is fixed on auxiliary speed-changing clutch shaft 61B and meshes with a bull gear 107 of center differential gear assembly 102.

Center differential gear unit 102 will be described with reference to FIG. 11. Center differential gear unit 102 has a differential casing 109 on which bull gear 107 is fixed. A front differential output shaft 105 and a rear differential output shaft 106 are coaxially extended forward and rearward, and relatively rotatably supported by front and rear ends of differential casing 109, respectively. In differential casing 109, front and rear differential side gears 112 are fixed onto a rear end of front differential output shaft 105 and a front end of rear differential output shaft 106, respectively. Front differential output shaft 105 projects forward from differential casing 109 and housing 25B, so as to be drivingly connected to front propeller shaft 16 via the universal joint. Rear differential output shaft 106 projects rearward from differential casing 109 and housing 25B, so as to be drivingly connected to rear propeller shaft 17 via the universal joint.

In differential casing 109, a pinion shaft 110 is disposed integrally rotatably with differential casing 109, and differential pinions 111 are pivoted on pinion shaft 110. Each of differential pinions 111 meshes with both front and rear differential side gears 112.

A rear end of differential casing 109 is extended rearward along rear differential output shaft 106, and a differential locking assembly 113 is disposed on the rearwardly extended portion of differential casing 109. In this regard, a differential locking slider 113 is axially slidably fitted on the rearwardly extended portion of differential casing 109. A differential locking pin 114 is fixed on differential locking slider 113, and inserted into differential casing 109. When differential locking slider 113 is shifted forward to a differential locking position, differential locking pin 114 is locked to rear differential side gear 112, thereby locking differential output shafts 105 and 106 to differential casing 109. To lock differential locking pin 114 to rear differential side gear 112, rear differential side gear 112 may have a rearwardly open recess, into which differential locking pin 114 can be inserted.

When differential locking slider 113 is shifted rearward to a differential position, differential locking pin 114 is separated from rear differential side gear 112 so as to allow differential rotation of differential output shafts 105 and 106. The differential rotation of differential output shafts 105 and 106 defines the differential rotation of front wheels 4 relative to rear wheels 5 in correspondence to the state that front wheels 4 are steerable and rear wheels 5 are unsteerable. Namely, center differential gear assembly 102 absorbs difference of rotary speed between steerable front wheels 4 and unsteerable rear wheels 5.

As shown in FIG. 10, front transaxle 100 incorporates a front differential gear assembly 103, which is drivingly connected to front propeller shaft 16 and differentially connects left and right differential output shafts 115 to each other. A transmission shaft 117 is interposed between each front wheel 4 and each differential output shaft 115 via universal joints so as to suspend front wheel 4 from differential output shaft 115. Front wheels 4 are steerably connected to respective transmission shafts 117, thereby serving as steerable wheels.

Rear transaxle 101 incorporates a rear differential gear assembly 104, which is drivingly connected to rear propeller shaft 17 and differentially connects left and right differential output shafts 116 to each other. Transmission shaft 117 is interposed between each rear wheel 5 and each differential output shaft 116 via universal joints so as to suspend rear wheel 5 from differential output shaft 116. Rear wheels 5 are unsteerably connected to respective transmission shafts 117, thereby serving as unsteerable wheels.

With respect to a turning center centered by cart 1B turning leftward or rightward, steered front wheels 4 are distant from the turning center farther than unsteerable rear wheels 5. Therefore, during turning of cart 1B, front wheels 4 have to be rotated faster than rear wheels 5 so as to prevent their being dragged on a ground. The differential rotation of differential output shafts 105 and 106 by center differential gear assembly 102 ensures the corresponding rotary speed difference between front wheels 4 and rear wheels 5 during turning of cart 1B.

In rear transaxle 101, rear differential gear assembly 104 is provided with a differential locking assembly 119, which can be operated for locking differential output shafts 116 to each other so as to cancel the differential rotation of rear wheels 5.

Only differential locking assembly 119 in rear transaxle 101 can be enough to have cart 1B escape from mud or a ditch. Alternatively or additionally, front differential gear assembly 103 in front transaxle 100 may be provided with a differential locking assembly.

A front wheel drive system 120, including front transaxle 100, front wheels 4 and transmission shafts 117 for suspending front wheels 4 from front transaxle 100, is disposed in front of transmission apparatus 10B. A rear wheel drive system 121, including rear transaxle 101, rear wheels 5 and transmission shafts 117 for suspending front wheels 5 from front transaxle 101, is disposed behind transmission apparatus 10B. Front and rear wheel drive systems 120 and 121 are similar to each other, excluding whether or not differential locking assembly 119 is provided, and whether or not drive wheels are steerable. Therefore, many parts of front and rear wheel drive systems 120 and 121 can be standardized.

It should also be understood that the foregoing relates to only a preferred embodiment of the invention, and that it is intended to cover all changes and modifications of the examples of the invention herein chosen for the purpose of the disclosure, which do not constitute departures from the spirit and scope of the invention.

What is claimed is:

1. A transmission apparatus for driving first and second axles of a working vehicle comprising:
    a first input shaft drivingly connected to a power source;
    a planetary gear assembly provided on the first input shaft so as to receive power of the first input shaft, the planetary gear assembly being drivingly connected to the first axle;
    a hydrostatic transmission drivingly connected to the planetary gear assembly, wherein the hydrostatic transmission is disposed on one side of the first input shaft; and
    a power take-off unit for driving the second axle, wherein the power take-off unit is disposed on another side of the first input shaft opposite to the hydrostatic transmission so as to receive an output power from the hydrostatic transmission.

2. The transmission apparatus according to claim 1, wherein the hydrostatic transmission and the power take-off unit are disposed fore-and-aft opposite to each other with respect to the first input shaft.

3. The transmission apparatus according to claim 2, wherein the hydrostatic transmission includes a second input shaft drivingly connected to the planetary gear and disposed in parallel to the first input shaft, and wherein the power takeoff unit includes an output shaft disposed perpendicular to the first and second input shafts.

4. The transmission apparatus according to claim 1, wherein the hydrostatic transmission and the power take-off unit are disposed vertically opposite to each other with respect to the first input shaft.

5. The transmission apparatus according to claim 4, wherein the hydrostatic transmission includes a second input shaft drivingly connected to the planetary gear and disposed in parallel to the first input shaft, and wherein the power take-off unit includes an output shaft disposed in parallel to the first and second input shafts.

6. The transmission apparatus according to claim 5, wherein the first and second input shafts and the output shaft of the power take-off unit are axially extended in the fore-and-aft direction of the working vehicle.

* * * * *